United States Patent
Bethea et al.

[11] 3,935,472
[45] Jan. 27, 1976

[54] THIN FILM LIQUID WAVEGUIDE OPTICAL CONVERTER

[75] Inventors: Clyde G. Bethea, East Orange; Barry Franklin Levine, Westfield; Ralph Andre Logan, Morristown, all of N.J.

[73] Assignee: Bell Telephone Laboratories, Incorporated, Murray Hill, N.J.

[22] Filed: Mar. 14, 1975

[21] Appl. No.: 558,424

[52] U.S. Cl. ......... 307/88.3; 321/69 R; 350/96 WG
[51] Int. Cl.² ...................... G02B 5/14; G02F 1/37
[58] Field of Search ............... 307/88.3; 321/69 R; 350/96 WG

[56] References Cited
UNITED STATES PATENTS

| | | | |
|---|---|---|---|
| 3,617,912 | 11/1971 | Miller | 330/4.6 |
| 3,793,541 | 2/1974 | Ashkin et al. | 307/88.3 |
| 3,810,688 | 5/1974 | Ballman et al. | 350/96 |
| 3,837,728 | 9/1974 | Logan et al. | 350/96 |
| 3,856,379 | 12/1974 | Burns et al. | 350/96 |

OTHER PUBLICATIONS

Miller, *Bell System Technical Journal*, Sept. 1969, pp. 2189–2219.
Tien et al., "J. Optical Society of America," Oct. 1970, pp. 1325–1337.
Ulrich, "J. Optical Society of America," Oct. 1970, pp. 1337–1350.
Somekh et al., "Applied Physics Letters", 15 Aug. 1972, pp. 140–141.
Polky et al., "Applied Physics Letters", 1 Oct. 1972, pp. 307–309.
Suematsu et al., "Applied Physics Letters", 1 Aug. 1973, pp. 137–138.
Bloembergen et al., "Applied Physics Letters", 1 Dec. 1970, pp. 483–485.
van der Ziel, "Applied Physics Letters", 15 Jan. 1975, pp. 60–61.

*Primary Examiner*—R. V. Rolinec
*Assistant Examiner*—Darwin R. Hostetter
*Attorney, Agent, or Firm*—D. I. Caplan

[57] ABSTRACT

An optically nonlinear liquid thin film in a thin film optical waveguide is utilized in order to produce optical parametric interactions such as second harmonic generation. Optimization (tuning) of parametric output by "phase matching" is achieved by means of an electric field which is set up in the liquid film, the field having a spatial periodicity along the propagation direction of the optical waves in the thin film. Alternative or further optimization of parametric output is achieved by varying the thickness of the liquid film in situ.

10 Claims, 2 Drawing Figures

THIN FILM LIQUID WAVEGUIDE OPTICAL CONVERTER

FIELD OF THE INVENTION

This invention relates to the field of optical parametric apparatus, and more particularly to thin film optical second harmonic generator devices.

BACKGROUND OF THE INVENTION

Optically nonlinear solid crystal media, with spatially periodic electric fields applied thereto, have been described in the prior art for the purpose of enhancing desired optical parametric interactions. See: S. E. Miller, *Bell System Technical Journal*, Vol. 48, pp. 2189–2219 (1969): "Some Theory and Applications of Periodically Coupled Waves"; and U.S. Pat. No. 3,617,912 issued to S. E. Miller on Nov. 2, 1971. These parametric interactions enable the conversion in a solid crystal medium of an optical input wave beam of given optical frequency (and wavelength) to an optical output wave beam of a different frequency (and wavelength). However, the solid crystal media required for these parametric devices are rather expensive to fabricate in order to yield sufficiently high quality, impurity-free optical nonlinear materials with tolerable optical loss. In addition, a solid medium in an optical parametric device has a tendency to crack or break up under the strains produced during operation by the relatively high-intensity optical waves required for reasonable efficiency of optical frequency conversion. In a second harmonic generator, for example, the second harmonic output intensity increases as the square of the input intensity, thereby necessitating the relatively high optical input intensity. Therefore, it would be desirable to have an optical second harmonic generator in which the optical nonlinear medium is not subject to the problems of high fabrication costs and of breakage during operation.

SUMMARY OF THE INVENTION

An optical second harmonic generator contains an optically nonlinear thin film waveguide containing a nonlinear liquid thin film medium. Advantageously, an external electric field is applied to the liquid film medium in order to produce or enhance a desired nonlinear interaction of the optical wave radiation energy in the liquid film. The optical coupling means for coupling an input fundamental optical wave into the film waveguide is arranged to favor the propagation of an optical waveguided fundamental mode in the film such that an optical second harmonic waveguided mode is supported in the film which is at least nearly phase matched with the fundamental mode. By phase matched is meant that the average velocity component of propagation along the waveguide is the same for both the fundamental and second harmonic modes. More nearly perfect phase matching (tuning), and hence increased optical second harmonic output, is achieved by means of an applied electric field having a spatial periodicity along the propagation direction such that the phase matching is still more nearly attained. Advantageously, the spatially periodic electric field is obtained by means of a spatially periodic electrode structure in the neighborhood of the liquid film, to which an electric voltage (typically D.C.) is applied. Alternative or further tuning of the phase matching is obtained by means of varying the thickness of the liquid film in situ or by means of varying the orientation of the propagation direction of the optical input beam with respect to the direction of maximum spatial periodicity of the electrode structure.

In a specific embodiment of the invention, a nonlinear liquid, such as nitrobenzene, is sandwiched between a pair of transparent solid thin film slab media, such as magnesium fluoride. The cavity space between these slabs is advantageously in the form of a parallel plate cavity, in which the liquid is situated filling the cavity. Each of the solid thin film media is of lower refractive index than that of the liquid; and each solid film is attached to a separate glass medium of higher refractive index than that of the liquid. Thereby, a thin film optical waveguide structure is formed in which the liquid film is located in an intermediate portion of the waveguide between the solid thin film slabs. Thus, the propagation of a fundamental optical radiation mode is supported in the combined solid and liquid thin film waveguide. Evanescent wave fields are introduced into at least one of the thin film solid slabs by means of optical coupling from an input beam which is directed into at least one of the relatively high refractive index glass media. For example, at least one of the glass media can take the form of an isosceles prism upon one of whose slant sides the input optical beam is directed and upon whose base is located one of the solid film media. In addition, advantageously, a spatially periodic electrode is located at the interface of at least one of the solid film media with its adjacent glass medium, in order to provide means for providing the spatially periodic electric field. Thereby, the spatially periodic electric field can more nearly phase match the output second harmonic waveguided optical mode with the input fundamental waveguided mode, thereby enabling increased output efficiency of second harmonic radiation.

In addition or alternatively to the spatially periodic electrodes, phase matching can be enhanced by means for varying the thickness in situ of the thin liquid film, simply by positioning a compressible spacing ring (with a liquid overflow aperture) separating the solid thin film media and placing the spacing ring under a variable compression force sufficient to vary the thickness of the liquid film and hence to vary suitably the fundamental and second harmonic wave velocities for better phase matching.

BRIEF DESCRIPTION OF THE DRAWING

These and other objects and advantages, the nature of the present invention, and its various features, will appear more fully upon consideration of the following detailed description when read in connection with the accompanying drawings in which.

For the sake of clarity only, none of the drawings is to scale.

DETAILED DESCRIPTION

Figure 1:
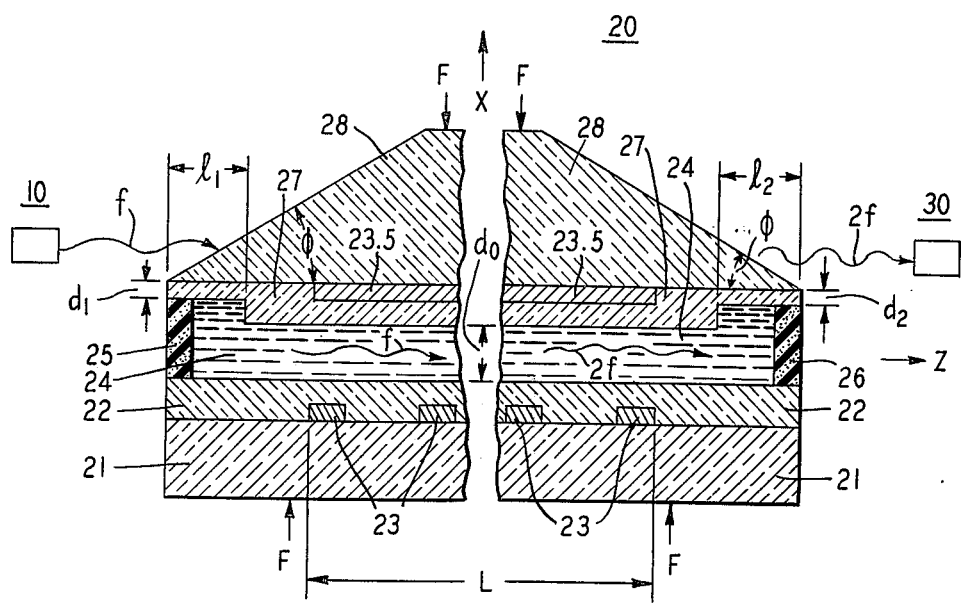
FIG. 1 is a cross-section diagram of optical second harmonic generator apparatus, in accordance with a specific embodiment of the invention.

As shown in FIG. 1, an optical input source 10 provides an input fundamental optical wave beam of advantageously substantially monochromatic optical frequency $f$. The wave is incident on a face of relatively high refractive index prism 28 in a second harmonic generator apparatus 20. The prism 28 is typically in the form of an isosceles triangular prism with base angles $\phi$ equal to about 30°. An optical output second harmonic wave beam $2f$ emerges from another face of the prism 28, characterized by an optical frequency $2f$, and is incident on utilization means 30 for utilizing this output (characterized by half the vacuum wavelength of the input wave).

The second harmonic generator 20 further includes a glass substrate 21 on which a spatially periodic electrode 23 is located. The electrode 23 is coated by a relatively low refractive index transparent solid film 22 having an advantageously optically flat surface in contact with a major surface of a thin nonlinear liquid film 24. Another low refractive index transparent solid film 27 has an advantageously optically flat surface in contact with an opposed parallel major surface of the liquid film 24. The solid films 22 and 27 are maintained spaced apart by solid spacers 25 and 26. Thereby, the distance $d_o$ between the solid films is substantially uniform in the central region, that is, in the region between the spacers. Alternatively, these spacers can be consolidated into a circular ring of elastic material with an aperture for overflow of liquid to and from an elastic container (not shown for clarity), thereby enabling (by means of applied compression forces) the variation of the distance $d_o$ between the opposed major parallel surfaces in the central region of the thin film. A ground plane electrode 23.5 is situated on the base of the glass prism 28, and the solid film 27 covers this electrode 23.5.

The solid film 27 has a step on its extreme left-hand (input) end and its right-hand (output) end, thereby producing relatively thin solid portions of lengths $l_1$ and $l_2$, and thicknesses $d_1$ and $d_2$ at these extremities. The values of $l_1$, $l_2$, $d_1$ and $d_2$ are selected to furnish suitable coupling regions of sufficient length and appropriate thickness to provide good optical coupling of the optical input and output radiation, respectively, into and out of the thin film waveguide, as known in the art and prescribed for example in an article by P. K. Tien and R. Ulrich in *Journal Optical Society of America, Vol.* 60, pp. 1325-1337 (1970), and R. Ulrich in *J. Opt. Soc. Am.*, Vol. 60, pp. 1337-1350 (1970). On the other hand, the central portion of the solid film 27 has an optically flat surface which, together with the optically flat surface of the other solid film 22, defines the liquid waveguide formed by the thin liquid film 24 in this central region. Advantageously, the thickness of the thin liquid film plus the thicknesses of the solid films 25 and 27 in this central waveguiding region is of the order of at least one-half of an optical wavelength (in the respective bulk materials) of the second harmonic output wave $2f$, in order to produce a significant waveguiding effect on the wave propagating along the Z direction in the waveguide, that is, to modify the average propagation velocity along the Z direction of the waves of frequency $f$ and $2f$ in the waveguide film from their values in bulk materials to a value which more nearly approximates matching of the velocities in the thin film waveguide of the fundamental and second harmonic waves. The spatial periodicity $p$ of the electrode 23 (FIG. 2) is advantageously such that the resulting periodicity $p$ of the electric field in the film in the propagation direction Z is such that the phase-matching equation $$k_2 = 2k_1 + k_p$$

is satisfied; where $k_2$ is the propagation constant of a second harmonic optical mode supported by the thin film waveguide, $k_1$ is the propagation constant of a fundamental optical mode supported by the thin film waveguide, and $k_p = (2\pi/p)\cos\theta$, where $\theta$ is the angle (FIG. 2) between the Z direction of optical propagation and the direction of spatial periodicity of the electrode 23. Thus, the phase matching can be tuned (adjusted) to an optimum by suitably orienting the incoming wave relative to the electrodes. If such orienting is not possible or sufficient for sufficiently precise matching, further tuning can be achieved by varying the thickness (and hence varying the waveguiding effect on both $k_1$ and $k_2$) of the liquid film, as by means of adjustable forces F compressing or expanding the prism towards or away from the glass substrate.

In a specific example, by way of illustration only, the source 10 is a pulsed YAG laser which provides an input laser beam with a vacuum wavelength of about 1.06 micron. The glass material for the prism 28 and the substrate 21 is of relatively high index of refraction, for example, $n_D = 1.805$. The solid material for the solid films 22 and 27 is of relatively low index, such as magnesium fluoride, ($n = 1.378$ at 1.06 micron wavelength) having a thickness of about 0.8 micron, except for the input coupling region $l_1$ where $d_1$ is about 0.2 micron and output coupling region $l_2$ where $d_2$ is about 0.05 micron. In this way, the thickness of the solid films 22 and 27 in the propagation region (between coupling regions $l_1$ and $l_2$) of the thin liquid film waveguide is sufficient that most of the evanescent wave fields lie within these solid films. The lengths of the coupling regions $l_1$ and $l_2$ are both about 1,000 microns, in order to provide sufficient coupling length into and out of the liquid film 24, namely about 1.5 times the input beam radius of the laser source 20. The spacing $d_o$ between the solid films 22 and 27 in the central portion is set in the range of about ½ to 5 microns, typically at about 1.0 micron, by means of the spacers 25 and 26, thereby enabling the phase matching condition to be satisfied for a variety of liquids in the thin film region 24. The spatial periodicity $p$ of electrode 23 is typically about 13.6 micron, so that the phase matching condition is satisfied for liquid nitrobenzene ($n_D = 1.541$) in the thin film 24 at angle $\theta$ to about 0. The electrodes 23 and 23.5 are gold on chromium, with spacing $w$ in electrode 23 equal to about 2.5 micron; as fabricated by a photolithographic masking process in conjunction with chemical etching of vacuum deposited metal layers. The glass prism angles $\phi$ (FIG. 1) are typically about 30° so that both the input beam and the output beam are nearly parallel to the prism base for the case of the liquid nitrobenzene in the thin liquid film 24. A D.C. voltage in the range of about 10 to 100 volts, typically about 30 volts, is applied by a battery 40 to electrode 23 during operation, with electrode 23.5 grounded. In this way, with 1500 periods of electrode fingers ($L = 2$ centimeters), second harmonic conversion efficiency can be obtained which is at least equal to that of the same length of a crystal of KDP.

Although it should be understood that the correctness of the theory of the invention is not essential to the practice thereof, it is believed that the generation of second harmonic optical radiation in such liquids as nitrobenzene is attributable to the third order coupling of the D.C. applied field of the battery 40 with the fundamental optical frequency $f$ (the latter taken twice) in the nonlinear liquid film 24. The spatial variations of the D.C. applied field give rise to the above-mentioned $k_p = (2\pi/p) \cos \theta$ (as well as further higher order $k_p = (2\pi m/p)\cos \theta$, where $m$ is an integer, with relative coupling strengths depending upon the Fourier resolution of the D.C. electric field). As mentioned above, by means of rotating the second harmonic generator 20 about its X axis (or by equivalent positioning of the source 20 and its laser beam direction), the angle $\theta$ can be varied for the purpose of tuning the phase-matching condition so that it is more nearly exactly satisfied. Thereby, the output of second harmonic radiation can be increased further by means of rotation around the X axis. Moreover, as mentioned previously, by varying the spacing provided by the spacers 25 and 26, additional or alternative tuning is furnished.

It should be obvious to the worker in the art that second harmonic generation with the apparatus shown in FIG. 1 is but one form of possible parametric interaction functions, that is, a special case of mixing of the input beam with itself for frequency doubling. By using two input beams of different frequencies, optical mixing of other parametric types such as down-conversion as well as up-conversion can be obtained, with suitable modification of the waveguide parameters. Moreover, parametric frequency down-conversion can likewise be obtained with but a single input frequency by utilizing the random optical noise in the waveguide as one of the optical inputs for interaction with the input laser beam, thereby making possible optical down-conversion when the parameters of the thin film waveguide are adjusted to favor the desired down-converted optical output frequency.

Figure 2:
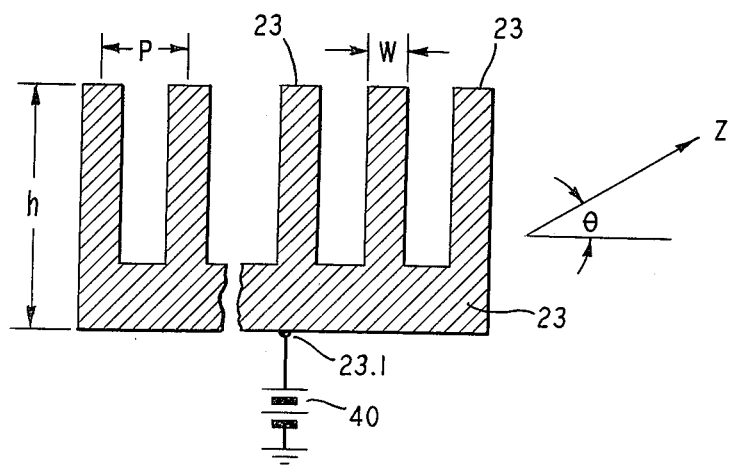
FIG. 2 is a top view diagram of a spatially periodic electrode structure useful in the apparatus shown in FIG. 1.

Although the invention has been described in terms of a specific embodiment, various modifications can be made without departing from the scope of the invention. For example, other optically nonlinear liquids can be used instead of nitrobenzene such as other types of polar (acentric molecular) or nonpolar molecules of substituted benzene rings or other conjugated molecules, nitroanaline or nitronapthalene for example. Moreover, other low refractive index solid film materials than magnesium fluoride can be used for the solid films 22 and/or 27 such as low index fluoride or oxide crystal and low index glasses. Finally, instead of the electrode finger configuration with a ground plane as shown in FIGS. 1 and 2, spatially alternating positively and negatively charged electrodes can be used either with a ground plane or with a corresponding set of alternating negatively and positively charged electrodes, as in the above-mentioned article and patent of S. E. Miller. While the electrode configuration of FIGS. 1 and 2 herein is easier to fabricate, the S. E. Miller configuration yields about twice the spatially periodic Fourier component of electric field for given applied voltage.

What is claimed is:
1. Apparatus which comprises
    a. a film of optically nonlinear liquid having a thickness defined by a pair of parallel surfaces of a pair of transparent thin film solid slabs which are spaced apart by said thickness, the slabs together with the liquid film forming an optical waveguide;
    b. spatially periodic electrode means adjacent the film for producing a spatially periodic electric field in the film said periodicity having a significant component in a first direction, in order to increase the intensity of an optical output wave of frequency different from the frequency of the input optical wave; and
    c. coupling means for coupling the input wave into the thin film waveguide for propagation therein along the first direction, and for coupling the output wave out of the film.
2. A second harmonic optical generator apparatus according to claim 1 in which the spatial periodicity is such that the frequency of the output wave is twice the frequency of the input wave for at least one frequency of the input wave.
3. Apparatus according to claim 2 in which the film is essentially nitrobenzene.
4. Apparatus according to claim 1 which further includes means for varying the thickness of the liquid film by varying the distance between the solid slabs.
5. Apparatus according to claim 1 which further includes utilization means for utilizing the output wave coupled out of the thin film waveguide.
6. Apparatus according to claim 1 which further includes a source of the input wave directed onto the coupling means for coupling into the thin film waveguide for propagation along the first direction.
7. Thin film apparatus which comprises:
    a. a thin film optical waveguide structure including a liquid film, which exerts a significant waveguiding effect on an input optical wave coupled into the thin film waveguide structure for propagation along a first direction, said liquid having a significant optically nonlinear coefficient; and
    b. spatially periodic electrode means in a neighborhood of the liquid film for producing a periodic electric field in the liquid film having a spatial periodicity along the first direction in order to favor a parametric interaction which yields an output optical wave of frequency different from that of the input.
8. Apparatus according to claim 7 which further includes coupling means for coupling the input wave into the thin film waveguide for propagation therein along the first direction, and for coupling the output wave out of the said waveguide.
9. Apparatus which comprises:
    a. a thin film of optically nonlinear liquid in an optical waveguide structure which exerts a significant waveguiding effect on an input wave propagating in the film along a first direction; and
    b. mechanical means for varying the thickness of the film in order to increase the optical parametric production of an output optical wave of frequency different from that of the input wave.
10. Apparatus according to claim 9 which further includes coupling means for coupling the input wave into the film and for coupling the output wave out of the film, and spatially periodic electrode means located in a neighborhood of the film said electrode having a significant periodicity along the first direction for increasing the parametric output further.

* * * * *